(12) United States Patent
Handte

(10) Patent No.: US 7,524,348 B2
(45) Date of Patent: Apr. 28, 2009

(54) DEVICE FOR COLLECTING AND REMOVING GASEOUS MEDIA, ESPECIALLY AIR, CONTAINING SOLID AND/OR LIQUID CONTAMINANTS

(75) Inventor: Jakob Handte, Bodman-Ludwigshafen (DE)

(73) Assignees: Raimund Rerucha, Stuttgart (DE); Ingo Meyer, Lindau (DE)

( * ) Notice: Subject to any disclaimer, the term of this patent is extended or adjusted under 35 U.S.C. 154(b) by 270 days.

(21) Appl. No.: 11/162,614

(22) Filed: Sep. 16, 2005

(65) Prior Publication Data

US 2006/0213159 A1 Sep. 28, 2006

(30) Foreign Application Priority Data

Sep. 17, 2004 (DE) .................. 20 2004 014 792 U

(51) Int. Cl.
*B01D 45/08* (2006.01)
(52) U.S. Cl. ............................ 55/418; 55/459.1; 55/428
(58) Field of Classification Search ............. 55/DIG. 3, 55/309, 312, 314, 315, 342, 337, 426, 447, 55/462, 465, 428, 459.1, 418, 449; 95/271
See application file for complete search history.

(56) References Cited

U.S. PATENT DOCUMENTS

| 3,753,336 | A | * | 8/1973 | Drew et al. .................... 96/228 |
| 3,898,068 | A | * | 8/1975 | McNeil ........................ 55/426 |
| 3,936,095 | A | * | 2/1976 | Every ..................... 303/122.14 |
| 5,427,685 | A | * | 6/1995 | Thorley .................... 210/512.1 |
| 5,558,697 | A | * | 9/1996 | Dyson et al. ..................... 95/12 |
| 5,599,365 | A | * | 2/1997 | Alday et al. .................. 55/426 |
| 5,641,339 | A | * | 6/1997 | Johnson ....................... 95/268 |
| 6,531,066 | B1 | * | 3/2003 | Saunders et al. ............ 210/787 |
| 7,160,347 | B2 | * | 1/2007 | David et al. .................... 55/337 |

FOREIGN PATENT DOCUMENTS

GB WO 02/03845 * 1/2002

* cited by examiner

*Primary Examiner*—Duane S Smith
*Assistant Examiner*—Sonji Turner
(74) *Attorney, Agent, or Firm*—Gudrun E. Huckett

(57) ABSTRACT

A device for collecting and removing a gaseous medium containing solid or liquid contaminants has at least one swirl chamber having at least a partially circular cross-section. A removal opening is provided through which the gaseous medium is removed by suction. In a flow path of the gaseous medium in a suction direction, at least one baffle element is arranged within the swirl chamber upstream of the at least one removal opening. The contaminants are separated from the gaseous medium by impacting on the baffle element.

36 Claims, 3 Drawing Sheets

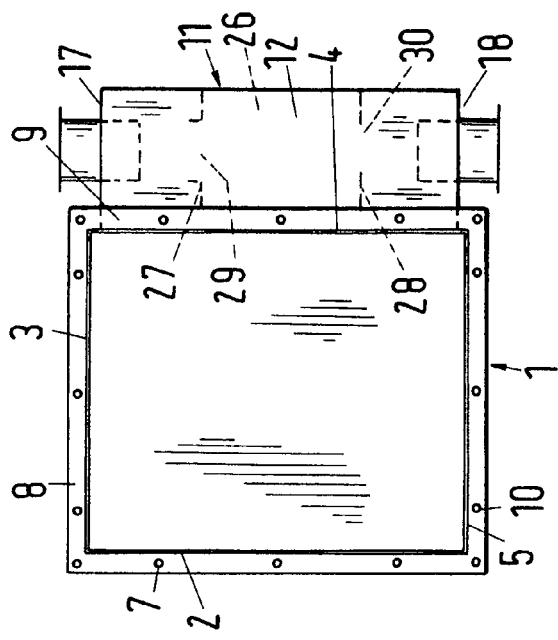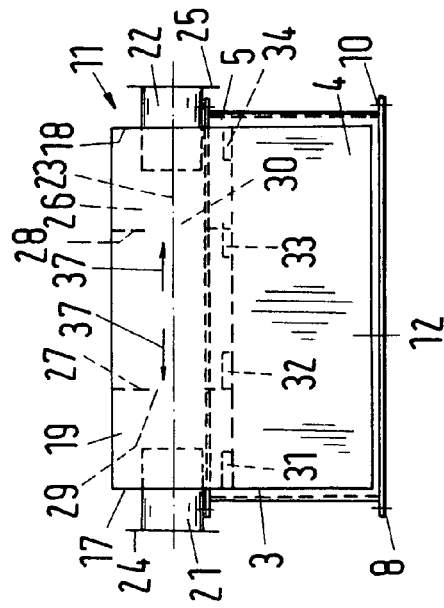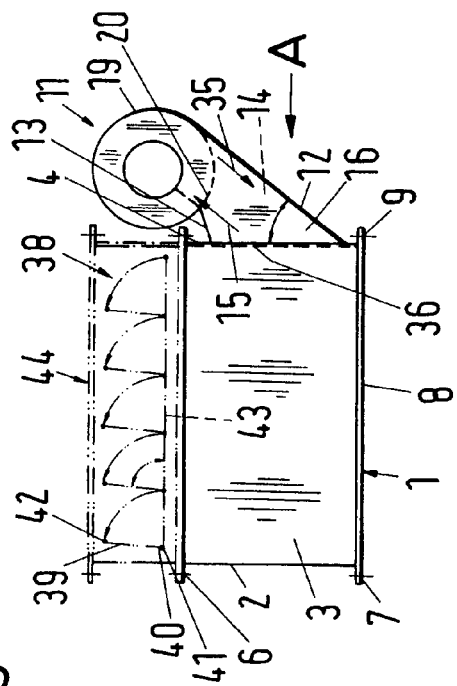

DEVICE FOR COLLECTING AND REMOVING GASEOUS MEDIA, ESPECIALLY AIR, CONTAINING SOLID AND/OR LIQUID CONTAMINANTS

BACKGROUND OF THE INVENTION

The invention relates to a device for collecting and removing by suction gaseous media, especially air, containing solid and/or illiquid contaminants. The device comprises at least one swirl chamber that has at least a partially circular cross-section and comprises at least one removal opening.

It is known to arrange machine tools in housing-like enclosures. During machining of workpieces on these machine tools, the air contained in the space enclosed by the enclosure is removed by suction. The air contains in general contaminants in the form of metal dust, metal particles or metal cuttings, droplets of cooling lubricant, and the like. In order to prevent these contaminants from reaching the suction or vacuum system as the air is being removed by suction from the housing-like enclosure, it is known to separate these solid and liquid contaminants from the air in a swirl chamber. In this swirl chamber, the taken-in air is subjected to a swirling or turbulent flow. The contaminants contained in the air are therefore separated by centrifugal force. It was found however that the contaminants can still reach the vacuum system through the suction opening despite the swirling chamber being interposed. This is particularly the case, for example, when during cutting operations performed on the machine tool the cuttings reach the device directly.

SUMMARY OF THE INVENTION

It is an object of the present invention to configure the device of the aforementioned kind such that the contaminants contained in the gaseous medium can be separated in a constructively simple way.

In accordance with the present invention, this is achieved in that at least one baffle element is arranged within the flow path of the gaseous medium within the swirl chamber upstream of the removal opening.

In the device according to the invention, a baffle element is arranged in the flow path of the gaseous medium within the swirl chamber. On the baffle element the contaminants that are contained within the gaseous medium are properly removed in that the contaminants hit the baffle element and are removed from the sucked-in gas flow in this way. In this constructively simple way the contaminants are reliably removed from the gaseous medium so that they do not reach the vacuum (suction) system via the removal opening.

BRIEF DESCRIPTION OF THE DRAWING

FIG. 1 is a side view of the device according to the invention for collecting and removing air or other gases.

FIG. 2 is a bottom view of the device according to FIG. 1.

FIG. 3 is a view in the direction of arrow A in FIG. 1.

DESCRIPTION OF THE PREFERRED EMBODIMENTS

Figure 5:
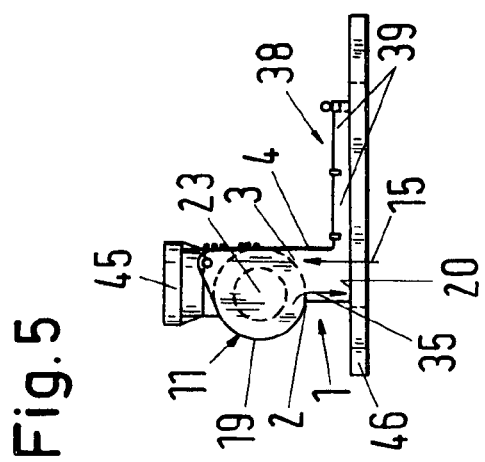
FIG. 5 is a side view of the device according to FIG. 4.

The device serves for removing by suction contaminated air in commercial or industrial areas. Advantageously, the device is used in connection with machine tools that are surrounded by housing-like enclosures. For machining workpieces, cooling lubricants and the like are used that reach the air present within the enclosure. Air is constantly removed by vacuum (suction) from the enclosure during workpiece machining. The contaminants contained in the air, such as cooling lubricants, cuttings and the like, are of course entrained. These air contaminants are caught in the device according to the invention so that only the air but not the contaminants reach the surroundings.

The device has a box-shaped housing 1 that has, for example, a rectangular contour. It has sidewalls 2 to 5 as well as a top wall 6. The ends of the sidewalls 2 to 5 facing away from the top wall 6 are angled outwardly at a right angle in order to provide fastening flanges 7 through 10. By means of these flanges the device is attached to the exterior of the enclosure of the machine tool. The housing-like enclosure of the machine tool has a suction opening above which the device is mounted. This suction opening has advantageously the same or only a slightly smaller cross-section than the intake cross-section that is delimited by the sidewalls 2 to 5 of the device. The sidewalls 2 to 5 and the top wall 6 are advantageously plane.

A swirling unit 11 is connected to the sidewall 4. The swirling unit 11 will subject in a way to be described in the following the sucked-in air containing contaminants to a swirling flow. The contaminants contained in the sucked-in air are separated from the air in the swirling unit 11 as a result of the centrifugal forces acting on the contaminates so that the contaminants are not removed by suction from the device together with the air and do not reach the vacuum system.

The swirling unit 11 has a lower, preferably plane, channel wall 12 that adjoins the sidewall 4 of the housing 1 in the vicinity of the fasting flange 9 (FIGS. 1 and 3). As shown in FIG. 3, this channel wall 12 extends almost across the entire width of the sidewall 4 between the sidewalls 3 and 5.

Opposed to channel wall 12 there is an additional channel wall 13 that adjoins the sidewall 4 of the housing 1 near the top wall 6. Both walls 12, 13 delimited a flow channel 14 that extends at a slant upwardly. The cross-section of the flow channel 14 tapers continuously in the suction direction 15 (FIG. 1). The lower channel wall 12 adjoins the housing sidewall 4 at a smaller acute angle than the top channel wall 13. The slant angle of the lower channel wall 12, for example, is approximately 40 degrees. This slant angle 16 is selected such that the contaminants that have been separated can reliably drop downwardly along the lower channel wall 12 of the flow channel 14.

The flow channel 14 is closed at both ends by a wall 17, 18, respectively, that is advantageously plane.

The lower channel wall 12 has a tangential transition into a cylinder wall 19. The cylinder wall 19 extends between the end walls 17, 18. In contrast to the channel wall 12, the channel wall 13 does not adjoin tangentially the cylinder wall 19 but at a location that is spaced from the cylinder wall 19 at a spacing that matches approximately the radius of the cylinder wall 19. Instead of the cylinder wall it is also possible to provide a circumferential wall that deviates from a circular cross-sectional shape or has a polygonal cross-sectional shape. The circumferential wall must only be designed such that a swirling or turbulent flow of the taken-in exhaust air can be generated.

In the area between the two sidewalls 12, 13 the cylinder wall 19 is provided with at least one intake opening 20 for the sucked-in exhaust air. The intake opening 20 can extend substantially across the entire axial length of the swirling unit 11 or of the cylinder wall 19. However, it is also possible that instead of the single intake opening several intake openings are provided that are advantageously arranged axially adjacent to one another. The intake opening 20 is preferably arranged such that it neighbors the channel wall 13. It is possible that the intake opening 20 is delimited at one edge by the channel wall 13.

In the illustrated embodiment, the end walls 17, 18 have a vacuum socket 21, 22 providing a removal opening, respectively. The two vacuum sockets 21, 22 are coaxially positioned relative to one another. Their axes are positioned to coincide with the axis 23 of the cylinder wall 19. By means of the vacuum sockets 21, 22, the air that has been removed by suction from the enclosure of the machine tool flows into the vacuum (suction) system. The vacuum sockets 21, 22 have a circular cross-section and are provided with a radial outwardly oriented annular flange 24, 25, respectively; the flanges 24, 25 provide the connection to the vacuum system.

In deviation from the illustrated embodiment, the swirling unit 11 can be provided with only one vacuum socket. In this case, the air is also reliably removed from the enclosure of the machine tool.

The vacuum sockets 21, 22 project partially into a swirl chamber 26 surrounded by a circumferential wall that is embodied as a cylinder wall 19.

At a spacing upstream of the end of the vacuum sockets 21, 22 located within the swirl chamber 26, a baffle element 27, 28 is arranged, respectively, that is shaped like a disk and has centrally a through opening 29, 30 for the air to be removed. The baffle elements 27, 28 are seal-tightly connected with their periphery to the inner side of the cylinder wall 19. When the swirling unit 11 has only one vacuum socket, there is of course only one baffle element positioned at a spacing upstream of the vacuum socket within the swirl chamber 26.

In the illustrated embodiment, the cylinder wall 19 has four outlet openings 31 to 34 (FIG. 3) in the area between the channel walls 12, 13; they have advantageously the same outlet cross-section. The outlet openings 31 to 34 are located in close proximity to the lower channel wall 12. It is possible to arrange the outlet openings 31 to 34 such that they are delimited at one side by the channel wall. The outlet openings 31 and 34 are positioned in the area below the vacuum sockets 21, 22. The outlet openings 32, 33 are positioned adjacent to the baffle elements 27, 28 on the sides of the baffle elements facing one another. The contaminants that drop out of the outlet openings 31 to 34 reach the downwardly oriented channel wall 12 and are guided along the channel wall 12 downwardly in the outlet direction 35 (FIG. 1).

The described and illustrated device forms a type of double cyclone with which the contaminants (dust, cuttings, dust particles, droplets of cooling lubricants and the like) contained in the air that is removed from the machine tool enclosure are pre-separated. Through the vacuum sockets 21, 22, the air that is contained in the housing-like enclosure of the machine tool is removed by suction. It flows first through the outlet opening provided in the enclosure into the housing 1. From here the contaminated air flows through an appropriate passage 36 in the housing sidewall 4 into the flow channel 14 that is oriented upwardly at a slant. The exhaust air flows at a slant upwardly in the suction direction 15 and reaches through the at least one intake opening 20 the swirl chamber 26. Because of the slantedly extending upper channel wall 13, the contaminated air flows approximately tangentially into the swirl chamber 26. On the inner side of the cylinder wall 19, the contaminated air is thus subjected to a swirling flow that has a high circumferential speed in comparison to the intake speed at which the air enters the swirl chamber 26. The taken-in air is guided along the inner side of the cylinder wall 19 in the direction towards the vacuum sockets 21, 22. The portion of the removed air that enters the area between the two baffle elements 27, 28 in the swirl chamber 26 impacts along its swirling flow path on the baffle elements 27, 28. As a result of the high centrifugal force within the swirling or turbulent flow of the air, the contaminants impact on and rebound from the baffle elements 27, 28 and drop along the inner side of the cylinder wall 19 downwardly where they exit through the outlet openings 32, 33 from the swirl chamber 26 and enter the flow channel 14.

The baffle elements 27, 28 are positioned perpendicularly to the axis 23 of the swirl flow 37 so that an optimal separation of the particles contained in the air is ensured. The disk-shaped baffle elements 27, 28 are positioned advantageously perpendicularly to the axis 23 of the cylinder wall 19. The air itself flows through the central through openings 29, 30 of the baffle elements 27, 28 to the vacuum sockets 21, 22. The through openings 29, 30 of the baffle elements 27, 28 have advantageously the same or substantially the same cross-section as the vacuum sockets 21, 22. Moreover, the vacuum sockets 21, 22 and the baffle elements 27, 28 are advantageously positioned on a common axis. In this way, the cleaned exhaust air can be removed by suction properly from the swirl chamber 26 at both ends of the swirling unit 11.

The portion of removed contaminated air that enters the swirl chamber 26 in the area between the baffle elements 27, 28 and the neighboring end walls 17, 18 is subjected to a swirling flow on the inner side of the cylinder wall 19 in the area between the baffle elements 27, 28 and the neighboring end walls 17, 18, respectively, so that the contaminants within this portion of the air are separated from the air as a result of centrifugal forces. These particles can pass downwardly through the outlet openings 31, 34 into the flow channel 14. In order to prevent the formation of deposits at the transition from the outlet openings 31 to 34 and the inner side of the cylinder wall 19, the outlet openings 31 to 34 are delimited on one side by the slanted channel wall 12 of the flow channel 14. The air that is contained in the area between the end walls 17, 18 and the baffle elements 27, 28 is mixed with the clean air flowing in through the through openings 29, 30.

The swirling unit 11 with its two vacuum sockets 21, 22 is particularly effective when it has a relatively great length. In the case of shorter swirling units 11, a single vacuum socket in one of the end walls is sufficient. Even though in this case, there is only one flow drain at one of the end walls 17 or 18, the described cleaning effect of the air is achieved to a satisfactory degree.

Advantageously, the device is provided with a flame or fire protection and/or explosion protection device. As illustrated in FIG. 1, on the top wall 6 of the housing 1 a pressure relief device 38 is arranged. It has slats 39 that are supported to be pivotable about one of their longitudinal edges 40. The slats 39 have such a width that the longitudinal edge opposite the pivot axis 41 rest on the longitudinal edge 40 of the neighboring slats 39 in the closed position. In this way, the slats 39 close in the initial position an opening 43 provided in the top wall 6. The slats 39 are positioned under their own weight in the horizontal closed position. When an explosion occurs within the housing-like enclosure of the machine tool, all slats 39 are pivoted simultaneously and independently from one another into the open position about the horizontal pivot axes 49; the open position is illustrated in FIG. 1. In this way, within a very short amount of time the entire cross-section of the opening 43 within the top wall 6 is released so that the pressure of the explosion can reach the exterior. In this way, it is ensured that neither the housing 1 nor the swirling unit 11 nor the vacuum system connected thereto become damaged by the explosion pressure. The slats 39 are supported on a frame (not illustrated) whose frame opening is closed by the slats 39. Depending on the size of the opening 43 in the top wall 6, the slats 39 can extend across the entire width of the opening. For a greater opening cross-section, two or more slats 39 can be arranged adjacent to one another to cover the width. In this case, the frame is provided with appropriate intermediate stays in order to support the adjacently positioned and aligned slats in a pivotable way.

Advantageously, the pressure relief device 38 is covered by a flame or fire protection device 44. The device 44 is advantageously a cage that is comprised of a close mesh wiremesh. In this way, in a simple but reliable way flames are prevented from exiting should there be a fire within the enclosure. The protective flame cage has advantageously the same contour as the top wall 6 of the housing 1.

The described device according to the present invention is advantageously provided on the top wall of the housing-like enclosure of the machine tool. Depending on the size of this enclosure, two or more such devices can be mounted. Also, it is possible to arrange the device on at least one sidewall of the enclosure.

In the embodiments according to FIGS. 4 through 6 and FIGS. 7 through 9, the device is provided with a central vacuum socket 45. It is provided at half the length of the box-shaped housing 1 that is mounted on the top wall 46 of the machine enclosure. In contrast to the preceding embodiment, the housing is of a narrow configuration and is completely open at its bottom side for forming the intake opening 20. In this way, during workpiece machining the air containing the contaminants can be reliably removed by vacuum from the enclosure. The great cross-section of the intake opening 20 ensures optimal air flow. The housing 1 is delimited by the longitudinal sidewalls 2, 4 as well as the narrow sidewalls 3, 5 perpendicularly positioned to the sidewalls 2, 4. The swirling unit 11 is provided at approximately half the height of the housing 1 and has a cylindrical wall 19 that projects outwardly past the longitudinal sidewall 2 of the housing 1. The wall 19 extends approximately across the entire length of the longitudinal sidewall 2 and delimits the swirl chamber 26 of the swirling unit 11.

Figure 4:
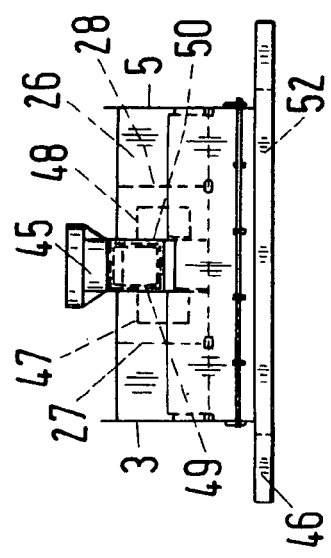
FIG. 4 is a front view of a second embodiment of a device according to the invention for collecting and removing air or other gases.
Figure 6:
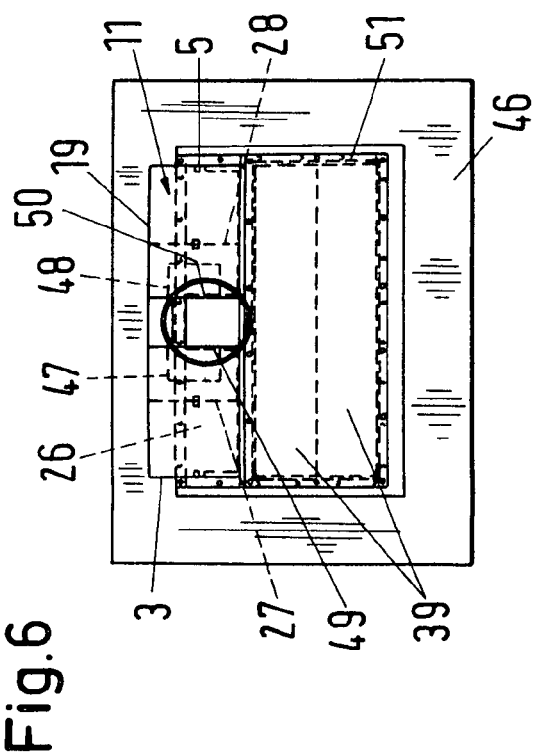
FIG. 6 is a plan view onto the device according to FIG. 4.

The vacuum socket 45 extends into the swirl chamber 26. The connection between the part of the vacuum socket 45 within the swirl chamber 26 and the swirl chamber 26 is realized by two dip pipes 47, 48 providing removal openings. The dip pipes 47,48 are of a cylindrical configuration and their axes are aligned with one another. The two dip pipes 47, 48 have advantageously the same diameter. They are advantageously of the same length and adjoin within the swirl chamber 26 the sidewall 49, 50 of the vacuum socket 45, respectively. In the sidewalls 49, 50 an opening is provided, respectively, whose cross-section matches at least the inner cross-section of the pipes 49, 50. As shown in FIG. 4 and FIG. 6, the dip pipes 47, 48 have a significant spacing from the narrow sidewalls 3, 5 of the housing 1. The dip pipes 47, 48 provide the only connection between the vacuum socket 45 and the swirl chamber 26. The outer diameter of the dip pipes 47, 48 is smaller than the inner diameter of the swirl chamber 26.

At a spacing upstream of the dip pipes 47, 48, a baffle element 27, 28 is arranged, respectively, within the swirl chamber 26. The baffle elements 27, 28 are of the same configuration as in the preceding embodiment and are connected seal-tightly within the swirl chamber 26. The baffle elements 27, 28 are shaped as an annular disks and have centrally a through opening for the air to be removed. The baffle elements 27, 28 are seal-tightly connected about their periphery to the inner side of the cylinder wall 19.

The device according to FIGS. 4 through 6 operates also like a cyclone with which the contaminants, such as dust, cuttings, dust particles, droplets of cooling lubricant and the like, are pre-separated from the removed air. Through the central vacuum socket 45 the air that is contained in the housing-like enclosure of the machine tool is removed by suction. It passes through the outlet opening of the enclosure and the open bottom side that forms the intake opening 20 into the housing 1. From here, the contaminated air flows through the length of the swirling unit 11 into the swirl chamber 26 approximately in a tangential direction. The contaminated air is subjected to a swirl flow on the inner side of the cylinder wall 19 which in accordance with the preceding embodiment has a high circumferential speed in comparison to the intake speed at which the air enters the swirl chamber 26. The sucked-in air is guided along the inner side of the cylinder wall 19 in a direction toward the vacuum socket 45. The portion of the sucked-in air that enters the swirl chamber 26 in the area between the two baffle elements 27, 28 impacts along its swirl path on the baffle elements 27, 28. Because of the high centrifugal force within the swirling or turbulent flow of the air, the contaminants rebound from the baffle elements 27, 28 and drop downwardly along the inner side of the cylinder wall 19. In FIG. 5, the outlet direction 35 of the separated contaminants is indicated; the contaminants drop in this flow direction out of the swirl chamber 26. In FIG. 5, the intake direction 15 of the contaminated air is illustrated also. The disk-shaped baffle elements 27, 28 are positioned advantageously perpendicularly to the axis 23 (FIG. 5) of the cylinder wall 19. The through openings of the baffle elements 27, 28 have advantageously the same or at least approximately the same cross-section as the dip pipes 47, 48. The baffle elements 27, 28 and the dip pipes 47, 48 have advantageously a common axis so that the cleaned exhaust air can be property removed by suction from the swirl chamber 26 through the two dip pipes 47, 48.

The portion of removed contaminated air that enters the swirl chamber 26 in the area between the baffle elements 27, 28 and the neighboring sidewalls of the swirling unit 11 is subjected to a swirling flow by the inner side of the cylinder wall 19 in the area between the respective baffle elements 27, 28 and the neighboring end face of the swirling unit 11 so that the contaminants contained in this portion of the air are separated because of centrifugal force. These particles drop downwardly along the inner side of the cylinder wall 19 out of the swirl chamber 26. The cleaned air passes through the through openings of the baffle elements 27, 28.

As in the preceding embodiments, the cleaned air exits through the vacuum socket 45.

The device is provided additionally with a pressure relief device 38 that is arranged in the area adjacent to the housing 1. In the illustrated embodiment, it has two slats 39 that have according to FIG. 6 a rectangular contour and are pivotably supported independently of one another within the frame 51. Depending on the size of the opening 52 arranged within the top wall 46 of the enclosure, additional slats can be provided. Particularly when the slats 39 have a large size, it is also possible to pivotably support them within a separate frame. In this case, the frames are mounted directly adjacent to one another or only at a minimal spacing next one another on the top wall 46 of the enclosure.

As in the preceding embodiment, the slats 39 are in the closed position when the machine enclosed in the enclosure operates normally. When within the enclosure a deflagration or an explosion occurs, the slats are suddenly and within a very short period of time pivoted out of the illustrated closed position in FIGS. 4 to 6 upwardly into the open position. The slats 39 are comprised of an appropriate lightweight material so that the pivot movement of the slats is possible quickly in a dangerous situation. Since the slats 39 are not coupled with one another but are pivotable independently of one another, the opening 52 in the top wall 46 of the enclosure is instantly opened completely so that the pressure within the enclosure can be released.

Advantageously, the frame 51 is connected fixedly to the housing 1 of the device. It is also possible to separately mount these two parts on the top wall 46 of the machine enclosure.

Figure 8:
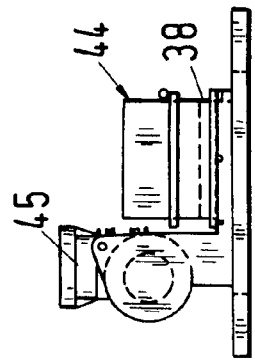
FIG. 8 is a side view of the device according to FIG. 7.
Figure 7:
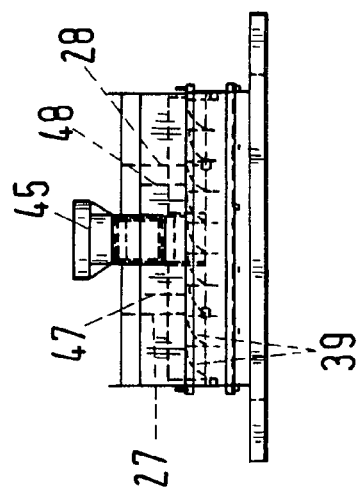
FIG. 7 is a front view of a third embodiment of the device according to the invention.
Figure 9:
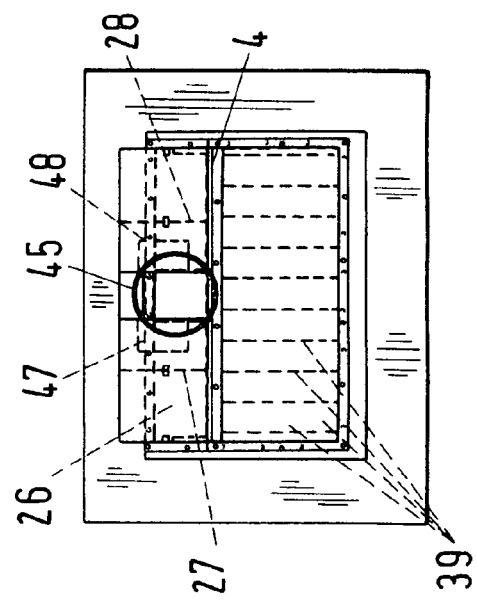
FIG. 9 is a plan view onto the device according to FIG. 7.

The embodiment according to FIGS. 7 through 9 is substantially identical to the preceding embodiment. The device has a central vacuum socket 45, two dip pipes 47, 48, and a swirl chamber 26 that is connected by the dip pipes 47, 48 to the vacuum socket 45. The contaminants contained within the air removed by suction are separated on the annular disk-shaped baffle elements 27, 28 in the way described above.

The difference to the preceding embodiment resides in that above the pressure relief device 38 a fire or flame protection device 44 is arranged. It is shaped like a hood or a cage and is comprised of a close mesh wiremesh. It prevents in a simple and reliable way flames from exiting should a fire break out within the enclosure.

As can be taken from FIGS. 7 and 9 in an exemplary fashion, the slats 39 of the pressure relief device 38 are positioned perpendicularly to the housing wall 4. Moreover, the slats 39 are significantly more narrow than in the preceding embodiment. As has been explained in connection with FIG. 1 to FIG. 3, all slats 39 can be pivoted independently from one another so that when a deflagration or an explosion occurs the slats move upwardly independently from one another out of the closed position illustrated in FIG. 9 into the open position illustrated in FIG. 7.

While specific embodiments of the invention have been shown and described in detail to illustrate the inventive principles, it will be understood that the invention may be embodied otherwise without departing from such principles.

What is claimed is:

1. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening;
   wherein the at least one swirl chamber is delimited by a circumferential wall;
   at least one flow channel adjoining the at least one swirl chamber;
   wherein the circumferential wall has at least two outlet openings connected to the at least one flow channel for contaminants separated from the air within the at least one swirl chamber;
   wherein the at least one baffle element is an annular disk that has a central through opening for the gaseous medium.

2. The device according to claim 1, wherein the at least one baffle element is positioned perpendicularly to the flow path.

3. The device according to claim 1, wherein the cross-sectional area of the through opening matches at least approximately the cross-sectional area of the at least one removal opening.

4. The device according to claim 1, wherein an axis of the through opening of the at least one baffle element coincides with an axis of the at least one removal opening.

5. The device according to claim 1, wherein the gaseous medium enters the at least one swirl chamber approximately tangentially.

6. The device according to claim 1, comprising at least one vacuum socket wherein the at least one removal opening is part of the at least one vacuum socket.

7. The device according to claim 6, wherein the at least one vacuum socket projects into the at least one swirl chamber.

8. The device according to claim 1, wherein a cross-section of the at least one flow channel tapers in the suction direction.

9. The device according to claim 1, wherein the at least one flow channel adjoins approximately tangentially the at least one swirl chamber.

10. The device according to claim 1, wherein the at least one flow channel has a sidewall that adjoins tangentially the circumferential wall.

11. The device according to claim 1, wherein the circumferential wall has at least one intake opening connected to the at least one flow channel.

12. The device according to claim 1, wherein a first one of the at least two outlet openings is arranged in the area of the at least one removal opening and a second one of the at least two outlet openings is located on a side of the at least one baffle element facing away from the at least one removal opening.

13. The device according to claim 1, wherein the at least two outlet openings have one edge that is formed by a sidewall of the at least one flow channel adjoining tangentially the circumferential wall.

14. The device according to claim 1, comprising a housing wherein the at least one flow channel adjoins the housing.

15. The device according to claim 14, wherein the housing is adapted to be mounted on an enclosure of a machine tool.

16. The device according to claim 1, comprising at least one vacuum socket wherein the at least one removal opening is part of the at least one vacuum socket, wherein the at least one vacuum socket projects centrally into the at least one swirl chamber.

17. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening;
   wherein the at least one swirl chamber is delimited by a circumferential wall;
   at least one flow channel adjoining the at least one swirl chamber;
   wherein the circumferential wall has at least two outlet openings connected to the at least one flow channel for contaminants separated from the air within the at least one swirl chamber;
   at least one vacuum socket wherein the at least one removal opening is part of the at least one vacuum socket, wherein the at least one vacuum socket projects centrally into the at least one swirl chamber;

at least one dip pipe arranged in the at least one swirl chamber and connected within the at least one swirl chamber to the at least one vacuum socket.

18. The device according to claim 17, wherein within the at least one swirl chamber two of the at least one dip pipe are connected opposite one another to the at least one vacuum socket.

19. The device according to claim 18, wherein the two dip pipes are identical.

20. The device according to claim 18, wherein the two dip pipes are positioned coaxial to one another.

21. The device according to claim 17, wherein an outer diameter of the at least one dip pipe is smaller than a diameter of the at least one swirl chamber.

22. The device according to claim 17, wherein the at least one baffle element is arranged between the at least one dip pipe and an end wall of the at least one swirl chamber neighboring the at least one baffle element.

23. The device according to claim 1, comprising a housing that is open at one side for forming an intake opening.

24. The device according to claim 1, comprising at least one pressure relief device.

25. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening; wherein the device further comprises at least one pressure relief device, wherein the pressure relief device comprises freely pivotable slats.

26. The device according to claim 25, wherein the slats each have a first longitudinal edge and are pivotably supported on the first longitudinal edge, respectively.

27. The device according to claim 26, wherein the slats each have a second longitudinal edge that rests on the first longitudinal edge of the neighboring slats in a closed position of the pressure relief device.

28. The device according to claim 25, wherein the slats are pivotable independently of one another.

29. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening; wherein the device further comprises at least one pressure relief device and at least one fire protection device, wherein the fire protection device is embodied as a cage.

30. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening: wherein the device further comprises at least one pressure relief device and at least one fire protection device, wherein the fire protection device is comprised of a close mesh wiremesh.

31. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening; wherein the device further comprises at least one pressure relief device and at least one fire protection device, wherein the fire protection device covers the pressure relief device.

32. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening; the device further comprising at least one fire protection device, wherein the at least one fire protection device is embodied as a cage or is comprised of close mesh wiremesh.

33. The device according to claim 32, wherein the at least one swirl chamber is delimited by a circumferential wall.

34. The device according to claim 33, comprising at least one flow channel adjoining the at least one swirl chamber.

35. The device according to claim 34, wherein the circumferential wall has at least two outlet openings connected to the flow channel for contaminants separated from the air within the at least one swirl chamber.

36. A device for collecting and removing a gaseous medium containing solid and/or liquid contaminants, the device comprising at least one swirl chamber having at least a partially circular cross-section and comprising at least one removal opening, wherein in a flow path of the gaseous medium in a suction direction at least one baffle element is arranged within the at least one swirl chamber upstream of the at least one removal opening;
   wherein the at least one swirl chamber is delimited by a circumferential wall;
   at least one flow channel connected to the circumferential wall of the at least one swirl chamber and supplying the gaseous medium to the at least one swirl chamber through an intake opening provided in the circumferential wall;
   wherein the circumferential wall has at least one outlet opening connected to the at least one flow channel so that contaminants separated from the gaseous medium within the at least one swirl chamber are removed from the at least one swirl chamber and returned into the at least one flow channel.

* * * * *